UNITED STATES PATENT OFFICE 2,089,558

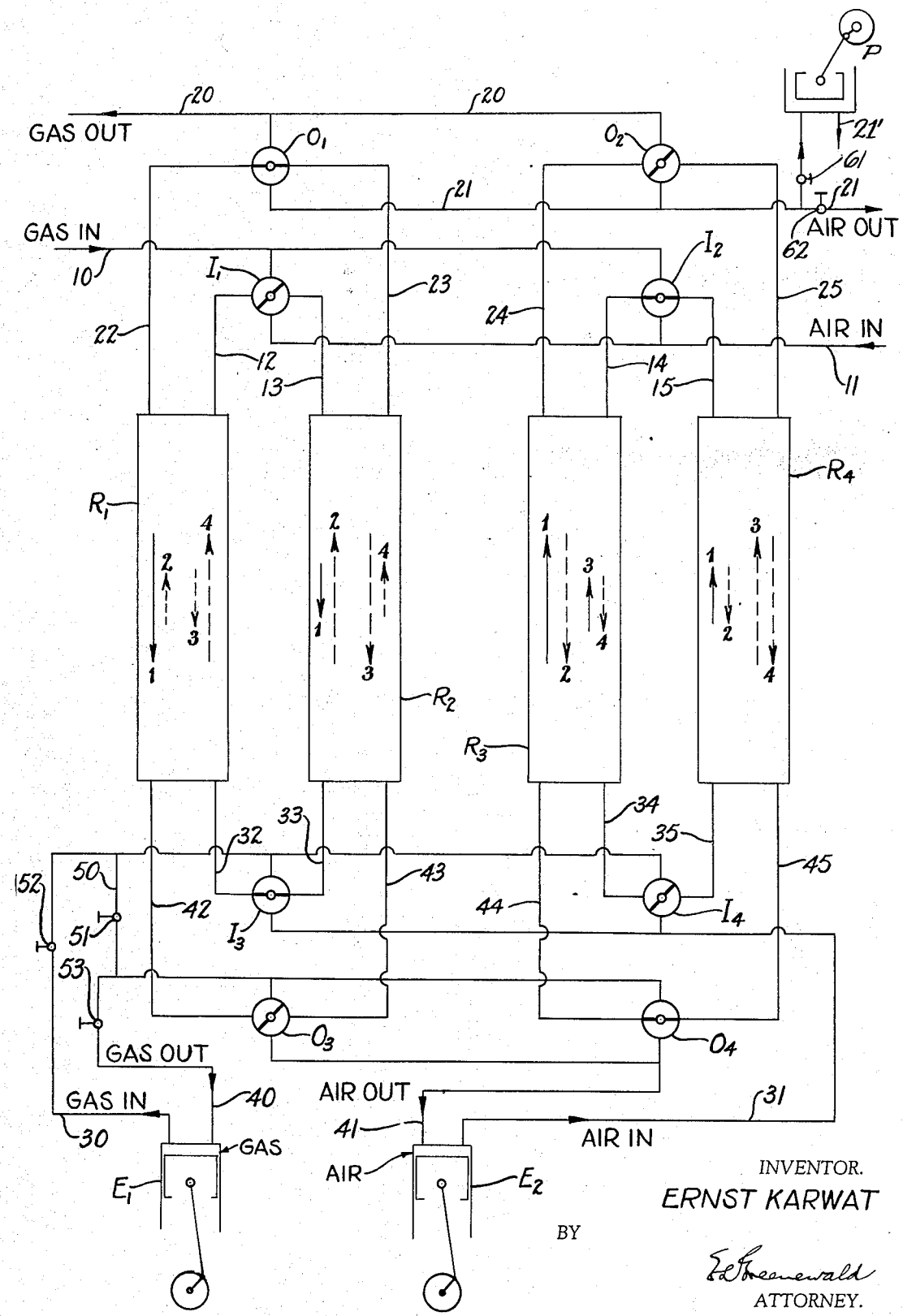

PROCESS AND APPARATUS FOR SEPARATING VAPORS FROM GASEOUS MIXTURES

Ernst Karwat, Grosshesselohe, near Munich, Germany, assignor, by mesne assignments, to Union Carbide and Carbon Corporation, a corporation of New York Application March 9, 1935, Serial No. 10,196
In Germany March 14, 1934

19 Claims. (Cl. 62—175.5)

This invention relates to a process and apparatus for separating vapors or relatively high-freezing constituents from gaseous mixtures by subjecting a gaseous mixture to a low temperature, whereby the vapors are precipitated in another phase, e. g. liquid or solid, and subsequently vaporizing the precipitated vapors by contacting therewith another gas. The invention is an improvement upon the process and apparatus disclosed in German Patent No. 554,570, filed August 19, 1929, and issued July 13, 1932, to Mathias Fränkl, and its corresponding United States Patent No. 1,979,682, issued November 6, 1934. Throughout the following specification, these two patents are collectively referred to as the "parent patent".

The parent patent describes a process according to which vapors, in particular water and carbon dioxide, are separated from gases by means of cooling and rewarming in periodically reversed cold accumulators. For this purpose the gas to be purified and an auxiliary gas, such as air, are alternately conducted through the cold accumulators in such a manner that the vapors precipitated from the gas in one period in the cold accumulators are again evaporated and discharged by the air flowing in the opposite direction during the immediately following period. With this method of operation, however, there exists the danger that, due to the jamming of a reversing valve, for example, air might enter the lines carrying the gas to be purified and, in the event the latter gas is combustible, the air would form an explosive mixture with this gas, so that the process can be utilized for purifying a combustible gas only when an inert auxiliary gas, such as, for example, nitrogen, is available for the vaporization of the condensates.

Accordingly, one object of this invention is to provide a process of the character indicated wherein explosion hazards resulting from the admixture of a combustible gaseous mixture from which vapors are to be separated and a reactive auxiliary gas are minimized.

Another object of this invention is to provide a process of the character indicated wherein the gas is recovered in an appreciably purer state than heretofore.

Another object of this invention is to provide a process of the character indicated wherein unequal quantities of heat transferred to and from any one regenerator due to unequal masses of the principal gas and the auxiliary gas are automatically equalized.

A further object of this invention is to provide novel arrangements of apparatus for carrying out the new process as will hereinafter more fully appear.

These and other objects of this invention and the novel features thereof which achieve these objects will become evident in the following detailed description, having reference to the accompanying drawing, in which the single figure is a diagrammatic arrangement of apparatus embodying the principles and illustrating the process of this invention.

The present invention eliminates the danger of explosion when utilizing a reactive gas, such as air, as the auxiliary gas. According to the invention, the pressure level of the air which serves to vaporize the carbon dioxide precipitated from the gas is adjusted in such a manner that the air in all parts of the apparatus is under a lower pressure than the gas to be purified. Then, if an interruption in the gas distribution occurs due to the jamming of a reversing valve, air cannot enter the gas lines and thus cause explosions there. If, on the other hand, combustible gas enters the air lines, no great explosion hazard is created, since the resulting gas-air mixture is immediately discharged to the atmosphere.

In carrying out the process, the absolute pressure level of the separation is optional. If, as is often the case, the gas is to be compressed only so much above atmospheric pressure as is required to overcome the flow resistance in the regenerators, the air is conducted through the regenerators at sub-atmospheric pressure, that is, under a vacuum. If it is desired to avoid vacuum operation, the gas is conducted through the apparatus at a correspondingly higher pressure than the air.

In all instances, the production of cold is effected as described in the parent patent by means of expanding the air or both the gas and air with the production of external work. In sub-atmospheric pressure operation, after the rewarming, the expanded air together with the carbon dioxide taken up is compressed in a vacuum pump to atmospheric pressure. If, in accordance with the method of operation described in the parent patent, one permits two accumulators to correspond with one another for cooling and warming the gas and air respectively, the leaving gas must always evaporate the water separated from the air during its cooling, since the regenerator will otherwise become stopped up with ice. If now, in accordance with this invention, the pressure of the gas is to be greater than that of the air, a complete vaporization of the condensates precipitated from the air is possible only when the gas volume is greater than the air volume. If both the pressure and the total volume of the gas are greater than that of the air, the mass of the gas is greater than that of the air, and the resulting inequality of the quantities of heat transferred during the cooling and rewarming must then be equalized in some manner, as by means of additional heat exchangers.

However, it would be more advantageous and practical to change the regenerators in a cyclic manner; that is, air as well as gas is conducted through each regenerator consecutively, alternately in both directions. In each individual regenerator then gas would be cooled in one period, whereby it gets rid of its carbon dioxide and water vapor content; in the following period a volume of air greater than that of the gas is warmed in this regenerator with vaporization of the condensates; in the third period air is cooled; and in the fourth gas is warmed.

The advantage of this method of operation is that errors in the distribution of the masses of gas to the various regenerators, or unequal measurement of the masses of air and gas, are automatically equalized, inasmuch as each regenerator warms as well as cools both kinds of gas and thus, due to its accumulative action, equalizes an excess of cold in one period against the cold deficiency of the corresponding period. Furthermore, with this method of operation it is not necessary that the gas, while being warmed, completely evaporate the condensates precipitated from the air. The portion of the condensates which is not evaporated by the outgoing gas then remains in the regenerator for two periods, until the air, in very large volume, is warmed therein, which then not only evaporates and carries out the carbon dioxide separated from the gas, but also the remainder of the condensates precipitated from the air. The gas is thus recovered in an appreciably purer state than heretofore, since it must otherwise always be contaminated with the entire condensible vapors contained in the auxiliary gas.

If, when utilizing a relatively impure auxiliary gas, it is desired to obtain the principal gas in a practically pure state, freed from carbon dioxide, then, according to the invention and in contrast to the heretofore customary methods of operation, the gas is warmed in the regenerators in a volume which is nearly equal to or smaller than that of the air cooled in the preceding period, so that the smallest possible fraction of the condensates deposited by the air during its cooling is taken up by the gas while being warmed.

Referring now to the drawing, an apparatus suitable for carrying out the novel process of this invention may comprise, in combination, four cold accumulators or regenerators $R_1$, $R_2$, $R_3$, and $R_4$, four inlet valves $I_1$, $I_2$, $I_3$, and $I_4$ for the regenerators, four outlet valves $O_1$, $O_2$, $O_3$, and $O_4$ for the regenerators, and two expansion engines $E_1$ and $E_2$. For purposes of simplicity, the gaseous mixture to be purified, that is, from which vapors or relatively high-freezing constituents are separated, will be hereinafter referred to as "gas", and the auxiliary gas through the agency of which such separation is effected will be hereinafter referred to as "air". A gas inlet conduit 10 and an air inlet conduit 11 communicate with each of the regenerators through the inlet valves $I_1$, and $I_2$ and through suitable connecting conduits 12, 13, 14, and 15; and a gas outlet conduit 20 and an air outlet conduit 21 communicate with each of the regenerators through the valves $O_1$ and $O_2$ and through suitable connecting conduits 22, 23, 24, and 25, all arranged as shown. Similarly, a gas inlet conduit 30, connected to the exhaust of the expansion engine $E_1$, and an air inlet conduit 31, connected to the exhaust of the expansion engine $E_2$, communicate with each regenerator through the inlet valves $I_3$ and $I_4$ and through suitable connecting conduits 32, 33, 34, and 35; and a gas outlet conduit 40, connected to the intake of the expansion engine $E_1$, and an air outlet conduit 41, connected to the intake of the expansion engine $E_2$, communicate with each regenerator through the outlet valves $O_3$ and $O_4$ and through suitable connecting conduits 42, 43, 44, and 45. Each valve is arranged to have three positions: closed entirely, open for gas but closed for air, and open for air but closed for gas. A conduit 50 having a control valve 51, and control valves 52 and 53 in conduits 30 and 40 respectively, may be provided for shunting out the expansion engine $E_1$, if it is desired to maintain the pressure of the gas at substantially the same level throughout the process.

In case it is desired to expand the air against a partial vacuum, a pump P may be provided which is connected to the conduit 21. Under these conditions valve 61 is open and valve 62 is closed and a partial vacuum is created in the line. Under these conditions the air leaves at 21'.

The operation of the apparatus in carrying out the novel process is as follows: The regenerators are first cooled to the required temperature by any suitable means. Valves 52 and 53 are open and valve 51 is closed. Gas, compressed to any desired pressure, for example, 0.5 atmosphere gage, enters the regenerator $R_1$ from conduit 10 through valve $I_1$ and conduit 12, and is cooled therein, so that vapors or high-freezing constituents are precipitated and deposited as liquid drops or as a frozen mass. The gas freed from vapors discharges from the regenerator $R_1$ through conduit 42, valve $O_3$, and conduit 40 into the expansion engine $E_1$ where it is expanded and further cooled with the production of external work. The cooled and expanded gas discharges from the expansion engine $E_1$ through conduit 30, valve $I_4$, and conduit 34 into the regenerator $R_3$, wherein it gives up its cold to the regenerator and vaporizes part or all of the vapors precipitated therein from the air in a previous period. The gas then discharges through conduit 24 and valve $O_2$ to the gas outlet conduit 20.

At the same time, air compressed to any desired pressure below the pressure of the compressed gas enters the regenerator $R_2$ from conduit 11 through valve $I_1$ and conduit 13, and is cooled therein so that any water vapor and carbon dioxide present are precipitated and deposited in the liquid or solid phases. The cooled and vapor-freed air discharges from the regenerator $R_2$ through conduit 43, valve $O_3$, and conduit 41 into the expansion engine $E_2$ where it is expanded to a lower pressure than the pressure of the expanded gas and further cooled with the production of external work. The cooled and expanded air discharges from the expansion engine $E_2$ through conduit 31, valve $I_4$, and conduit 35 into the regenerator $R_4$, wherein it gives up its cold to the regenerator and vaporizes all of the vapors precipitated from the gas in a previous period and any remaining vapors precipitated from the air in a previous period. The air then discharges through conduit 25 and valve O₂ to the air outlet conduit 21. Thus, during this period, the regenerator R₁ is being warmed with entry gas from which vapors are being precipitated, and the regenerator R₃ is being cooled with exit gas; and concomitantly the regenerators R₂ and R₄ are being prepared for use by warming the regenerator R₂ with entry air and cooling and purging the regenerator R₄ with exit air.

The valves O₁, O₄, I₂, and I₃ are closed during this period as shown, and the gas and air flow is represented by the solid arrows in the drawing, the long arrows representing the flow of gas and the short arrows representing the flow of air. This period is numbered 1 for reference purposes, and the succeeding periods in order are numbered 2, 3, and 4, and the flow of gas and air is indicated by the dotted arrows so numbered, the valves being changed accordingly. These four periods represent a complete cycle which may be repeated indefinitely. Thus, in each regenerator, gas is first cooled and vapors precipitated; air is then warmed and all the precipitated vapors vaporized; air is then cooled and any vapors therein precipitated; and finally gas is warmed and part or all of the precipitated vapors vaporized.

If it is desired to obtain the gas freed from vapors in a relatively very pure state, the volume of the gas being warmed in any one regenerator may be controlled to be less than the volume of air which has previously been cooled therein, so that only a very small part of the vapors precipitated from the air is vaporized and discharged by the gas. If the gas must be compressed anyway for subsequent use, this volume control may be conveniently obtained by closing valves 52 and 53 and opening valve 51, so that the expansion engine E₁ is shunted out and the gas is not expanded between the entry and the exit accumulators. The air is compressed to some pressure below the pressure of the gas, and is passed through the accumulators in relatively very large volume, being expanded between the entry and the exit accumulators in the expansion engine E₂, so that all the vapors previously precipitated from gas and any remaining vapors previously precipitated from air are vaporized and discharged by the large volume of exit air. At the same time, the losses in cold are compensated for by the expansion of the air with the production of external work. Also, since each accumulator serves both as an entry and exit accumulator for both gas and air, any inequalities in the transfer of cold due to mass differences between the gas and air are automatically equalized. Thus, for example, in regenerator R₂ any cold deficiency due to the passage of a large mass of warm entry air in the first period is compensated for by the passage of the same mass of cold exit air in the fourth period.

It will, of course, be appreciated that certain changes may be made in practicing the herein-described process and in the construction and arrangement of apparatus for carrying out the new process without departing from the principles or scope of this invention as indicated in the appended claims.

What is claimed is:

1. Process for separating vapors from gaseous mixtures, which comprises subjecting a gaseous mixture to a low temperature in a cold yielding zone whereby vapors are precipitated therein in another phase; subjecting an auxiliary gas to a low temperature in a cold yielding zone; vaporizing completely said precipitated vapors with said auxiliary gas; and maintaining the pressure of said auxiliary gas at all points below the pressure of said gaseous mixture.

2. Process for separating vapors from gases, which comprises cooling a gas whereby vapors are precipitated in another phase; warming said vapor-freed gas; cooling an auxiliary gas; expanding said auxiliary gas whereby it is further cooled; vaporizing completely said precipitated vapors with said expanded auxiliary gas; and maintaining the pressure of said first-mentioned gas at all points above the pressure of said auxiliary gas.

3. Process for separating vapors from gaseous mixtures, which comprises subjecting a gaseous mixture to a low temperature whereby vapors are precipitated therefrom in another phase; subjecting an auxiliary gas to a low temperature whereby vapors are precipitated therefrom in another phase; vaporizing completely said first-mentioned precipitated vapors by passing said auxiliary gas in contact therewith; vaporizing said second-mentioned precipitated vapors by passing said vapor-freed gaseous mixture in contact therewith; and maintaining the pressure of said gaseous mixture at all points above the pressure of said auxiliary gas.

4. Process for separating higher-freezing from lower-freezing constituents in gaseous mixtures, which comprises passing a gaseous mixture through a cold regenerator, whereby the regenerator is warmed, the gaseous mixture is cooled, and the higher-freezing constituents are precipitated therefrom as a frozen mass; passing an auxiliary gas through another cold regenerator, whereby the regenerator is warmed and the gas is cooled; expanding said auxiliary gas, whereby the gas is further cooled; passing said expanded gas through said first-mentioned regenerator, whereby the regenerator is cooled, the precipitated constituents are vaporized, and the gas is warmed; passing said purified gaseous mixture through said second-mentioned regenerator, whereby the regenerator is cooled and the gas is warmed; and maintaining the pressure of said gaseous mixture at all points above the pressure of said auxiliary gas.

5. Process for separating vapors from gases, which comprises compressing a gas; cooling said compressed gas, whereby vapors are precipitated therefrom and deposited in another phase; warming said vapor-freed gas; compressing an auxiliary gas to a lower pressure than the pressure of said first-mentioned gas; cooling said auxiliary gas; expanding said auxiliary gas, whereby it is further cooled; and vaporizing completely said precipitated vapors with said expanded auxiliary gas.

6. Process for separating vapors from gaseous mixtures, which comprises cooling a gaseous mixture in a cold accumulator, whereby cold is transferred from said accumulator to said gaseous mixture, so that vapors are precipitated therefrom in another phase; cooling an auxiliary gas in another cold accumulator, whereby cold is transferred from said accumulator to said auxiliary gas; warming said vapor-freed gaseous mixture in said last-mentioned cold accumulator, whereby cold is transferred from said gaseous mixture to said cold accumulator; warming said auxiliary gas in said first-mentioned cold accumulator, whereby cold is transferred from said auxiliary gas to said cold accumulator and said precipitated vapors are vaporized; and maintaining the pressure of said gaseous mixture at all points above the pressure of said auxiliary gas.

7. Process for separating vapors from gaseous mixtures, which comprises cooling a gaseous mixture by contact with a cold regenerator, whereby vapors are precipitated therein in another phase, and subsequently warming said gaseous mixture by contact with a warm regenerator; and concomitantly preparing a second pair of regenerators for use by warming one of said pair with an auxiliary gas and cooling and purging the other of said pair with said auxiliary gas; all of said regenerators being employed in a repeating cycle comprising cooling the gaseous mixture, cooling and purging the regenerator with auxiliary gas, cooling the auxiliary gas, and cooling the regenerator with the vapor-freed gaseous mixture.

8. Process for separating vapors from gases, which comprises cooling a gas by contact with a cold regenerator, whereby vapors are precipitated therein, and subsequently warming said vapor-freed gas by contact with a warm regenerator; and concomitantly cooling an auxiliary gas by contact with a cold regenerator and subsequently warming said auxiliary gas by contact with a warm regenerator, whereby said last-mentioned regenerator is purged of all precipitated vapors; all of said regenerators being employed in a repeating cycle comprising cooling the principal gas, warming the auxiliary gas, whereby precipitated vapors are vaporized, cooling the auxiliary gas, and warming the principal gas.

9. Process according to claim 8, which includes the step of expanding the auxiliary gas between its cooling and warming.

10. Process according to claim 8 which includes the step of expanding both the principal gas and the auxiliary gas between their cooling and warming.

11. Process according to claim 8 which includes the step of maintaining the pressure of the auxiliary gas at all points below the pressure of the principal gas.

12. Process according to claim 8, which includes the step of controlling the volume of the principal gas during its warming to be less than the volume of the auxiliary gas during its cooling.

13. Process for separating vapors from gases which comprises cooling a gas by contact with a cold regenerator, whereby said regenerator is warmed and vapors are precipitated therein; cooling an auxiliary gas by contact with a cold regenerator, whereby said regenerator is warmed and vapors are precipitated therein; warming said vapor-freed principal gas by contact with said second-mentioned regenerator; warming said auxiliary gas by contact with said first-mentioned regenerator; and so controlling the relative volumes of the principal and auxiliary gas that the principal gas vaporizes only a small part of the vapors precipitated from the auxiliary gas while the auxiliary gas vaporizes all the vapors precipitated from the principal gas and the balance of the vapors previously precipitated from the auxiliary gas.

14. Process according to claim 13, which includes the step of maintaining the pressure of the principal gas at all points above the pressure of the auxiliary gas.

15. Process according to claim 13, which includes the step of expanding the auxiliary gas between its cooling and warming.

16. Apparatus for separating vapors from gases, comprising the combination of four regenerators; means for separately conducting two different gases through each of said regenerators in both directions; means for so controlling said conducting means that the first gas flows in through one of said regenerators and out in the opposite direction through another of said regenerators while the second gas flows in through another of said regenerators and out in the opposite direction through another of said regenerators; and means for periodically so changing said controlling means that each of said regenerators serves as an entry regenerator for one gas, an exit regenerator for the second gas, an entry regenerator for the second gas, and an exit regenerator for the first gas in succession.

17. Apparatus for separating vapors from gases, comprising the combination of four regenerators; means for separately conducting two different gases through each of said regenerators in both directions; means for so controlling said conducting means that the first gas flows in through one of said regenerators and out in the opposite direction through another of said regenerators while the second gas flows in through another of said regenerators and out in the opposite direction through another of said regenerators; means for periodically so changing said controlling means that each of said regenerators serves successively as an entry regenerator for the first gas, an exit regenerator for the second gas, an entry regenerator for the second gas, and an exit regenerator for the first gas; and means for expanding at least one of said gases between its entry and exit regenerator.

18. Process for separating vapors from gases, which comprises cooling a gas at a pressure slightly above atmospheric pressure whereby vapors are precipitated therefrom in another phase; warming said vapor-freed gas; cooling an auxiliary gas at atmospheric pressure; expanding said auxiliary gas to a pressure below atmospheric pressure whereby it is further cooled; and vaporizing said precipitated vapors with said expanded auxiliary gas.

19. Process for separating higher-freezing from lower-freezing constituents in gaseous mixtures, which comprises passing a gaseous mixture at a pressure slightly above atmospheric pressure through a cold regenerator whereby the regenerator is warmed, the gaseous mixture is cooled and the higher-freezing constituents are precipitated therefrom as a frozen mass; passing an auxiliary gas through another cold regenerator at atmospheric pressure whereby the regenerator is warmed and the gas is cooled; expanding said auxiliary gas to a pressure below atmospheric pressure whereby the gas is further cooled; passing said expanded gas through said first-mentioned regenerator whereby the regenerator is cooled, the precipitated constituents are vaporized, and the gas is warmed; and passing said purified gaseous mixture through said second-mentioned regenerator whereby the regenerator is cooled and the gas is warmed.

ERNST KARWAT.